United States Patent
Yasuda

(10) Patent No.: US 11,617,360 B2
(45) Date of Patent: Apr. 4, 2023

(54) FISHING REEL AND BACKLASH CORRECTION STATUS DETERMINATION DEVICE

(71) Applicant: GLOBERIDE, Inc., Tokyo (JP)

(72) Inventor: Hiromu Yasuda, Toyko (JP)

(73) Assignee: GLOBERIDE, Inc., Tokyo (JP)

( * ) Notice: Subject to any disclaimer, the term of this patent is extended or adjusted under 35 U.S.C. 154(b) by 16 days.

(21) Appl. No.: 17/411,641

(22) Filed: Aug. 25, 2021

(65) Prior Publication Data

US 2022/0061286 A1    Mar. 3, 2022

(30) Foreign Application Priority Data

Aug. 27, 2020 (JP) .............................. JP2020-143241

(51) Int. Cl.
  *A01K 89/01*    (2006.01)
  *A01K 89/015*   (2006.01)
  *A01K 89/0155*  (2006.01)

(52) U.S. Cl.
  CPC .. *A01K 89/01931* (2015.05); *A01K 89/01556* (2015.05)

(58) Field of Classification Search
  CPC ........ A01K 89/01931; A01K 89/01556; A01K 89/0155
  See application file for complete search history.

(56) References Cited

U.S. PATENT DOCUMENTS

2017/0208788 A1*  7/2017  Numata ........... A01K 89/01555
2020/0165109 A1   5/2020  Niitsuma

FOREIGN PATENT DOCUMENTS

| CN | 110432236 A | * | 11/2019 | ......... A01K 89/0155 |
| JP | 2002262736 A | * | 9/2002 | |
| JP | 2008154522 A | * | 7/2008 | |
| JP | 2017018052 A5 | * | 6/2018 | |
| JP | 2019126270 A | * | 8/2019 | ......... A01K 89/0155 |
| JP | 2020080766 A | | 6/2020 | |

OTHER PUBLICATIONS

Office Action for related Chinese Application No. 202110966604.1; dated Oct. 8, 2022; (16 pages).

* cited by examiner

*Primary Examiner* — Emmanuel M Marcelo
(74) *Attorney, Agent, or Firm* — K&L Gates LLP

(57) ABSTRACT

A fishing reel according to an embodiment of the present disclosure is configured to include a spool capable of winding a fishing line, an operation portion that rotates the spool, a rotation detector that detects the rotation of the spool, and a determination portion that determines the backlash correction status from the output of the rotation detector.

10 Claims, 8 Drawing Sheets

! Total backlash time reached 1 hour !

Hang in there!

▼ See this video for how to disentangle a fishing line.

▼ See this video for how to cast

FIG. 8

FISHING REEL AND BACKLASH CORRECTION STATUS DETERMINATION DEVICE

CROSS-REFERENCE TO RELATED APPLICATIONS

This application claims priority under 35 U.S.C. § 119 to Japanese Patent Application No. 2020-143241 filed on Aug. 27, 2020, in the Japanese Intellectual Property Office, the entire contents of each hereby incorporated by reference.

FIELD

The present disclosure relates to a fishing reel capable of determining a backlash correction status, and a backlash correction status determination device.

BACKGROUND

It is known that when the unwinding speed of a fishing line cast is faster the rotation speed of a spool, part of the fishing line is not unwound and remains in a reel, which causes a backlash in which the fishing line becomes entangled. For example, in a double-bearing reel, the rotation of a spool on which a fishing line is wound is braked as a measure to reduce a backlash, However, it is not easy to control the braking force as a flying distance decreases if the braking force is too strong.

As an example of such fishing reels, Japanese Patent Application Publication No. 2020-080766 ("Patent Literature 1") discloses a reel braking adjustment device having a tension-related information acquisition portion (tension-related information acquisition unit) for acquiring information on the tension acting on the fishing line that is detected during the period when the fishing line is unwound from a double-bearing reel with a function of braking the rotation of the spool based on a braking parameter, and a braking parameter corrector (braking parameter correcting unit or braking parameter correcting portion) that corrects braking parameters based on the change over time in the tension-related information obtained by the tension-related information acquisition portion.

SUMMARY

However, there was a problem in the configuration according to Patent Literature 1 that it was not possible to determine whether or not any backlash has actually occurred upon casting though a correction guidance screen displayed the change over time in the tension-related information. Then, a judgement of whether backlash has actually occurred or not depends solely on users' memories, which caused a problem that users were unable to check the history of the occurrence of backlash and to make effective use of such results at all.

The present disclosure has been made in view of the above circumstances, and the objective thereof is to provide a fishing reel capable of distinguishing the occurrence of a backlash, and a backlash correction status determination device. Other purposes of the present disclosure will become apparent upon reference to this specification in its entirety.

A fishing reel according to an embodiment of the present disclosure is configured to include a spool capable of winding a fishing line, an operation portion (operation unit) that rotates the spool, a rotation detector (rotation detecting unit or rotation detecting portion) that detects the rotation of the spool, and a determination portion (determination unit) that determines from an output of the rotation detector whether or not a backlash correction is in progress ("backlash correction status").

In a fishing reel according to an embodiment of the present disclosure, the determination portion is configured to determine that there is a shift to the backlash correction status when the spool rotation speed becomes equal to or greater than a predetermined pull-out speed a plurality of times.

In a fishing reel according to an embodiment of the present disclosure, the determination portion is configured to determine that the backlash correction status ends when the spool rotation speed becomes equal to or greater than a predetermined winding speed.

A fishing reel according to an embodiment of the present disclosure includes a display (display unit or display portion), wherein the display is configured to display at least one of the backlash correction status, the time spent in the backlash correction status, or the ratio of the cumulative time spent in the backlash correction status to the usage time of the fishing reel.

A fishing reel according to an embodiment of the present disclosure includes a transmitter (transmitting unit or transmitting portion), wherein the transmitter is configured to transmit to the outside at least one of the backlash correction status, the time spent in the backlash correction status, or the ratio of the cumulative time spent in the backlash correction status to the usage time of the fishing reel.

In a fishing reel according to an embodiment of the present disclosure, the display is configured to display an advisory, encouragement, or admiring message related to the backlash correction according to the time spent in the backlash correction status.

A fish fishing reel according to an embodiment of the present disclosure includes a spool brake (spool braking unit or spool braking portion), wherein the spool brake is configured to change a spool braking force according to the time spent in the backlash correction status.

In a fishing reel according to an embodiment of the present disclosure, the time spent in the backlash correction status is configured to be at least one of the time spent on each backlash correction or a cumulative time spent on a plurality of backlash corrections.

A fishing reel according to an embodiment of the present disclosure includes a storage (storing unit or storing portion), wherein the storage is configured to associate and store the setting of the braking force of the spool and the backlash correction status.

A fishing reel according to an embodiment of the present disclosure includes a skill level evaluator (skill level evaluation unit or skill level evaluation portion), wherein the skill level evaluator evaluates the skill level according to the ratio of the time spent in the backlash correction status to the usage time of the fishing reel, and wherein the display is configured to display the skill level.

A backlash correction status determination device according to an embodiment of the present disclosure is configure to include a rotation detector (rotation detecting unit or rotation detecting portion) that detects the rotation of a spool capable of winding a fishing line, and a determination portion that determines the backlash correction status from the output of the rotation detector.

According to the above embodiment, it is possible to provide a fishing reel capable of detecting the occurrence of a backlash and a backlash correction status determination device.

BRIEF DESCRIPTION OF THE DRAWINGS

FIG. 8 is a diagram illustrating an example of a display screen of the fishing reel 1 or the backlash correction status determination device 100 according to an embodiment of the present disclosure.

DETAILED DESCRIPTION

Figure 1:
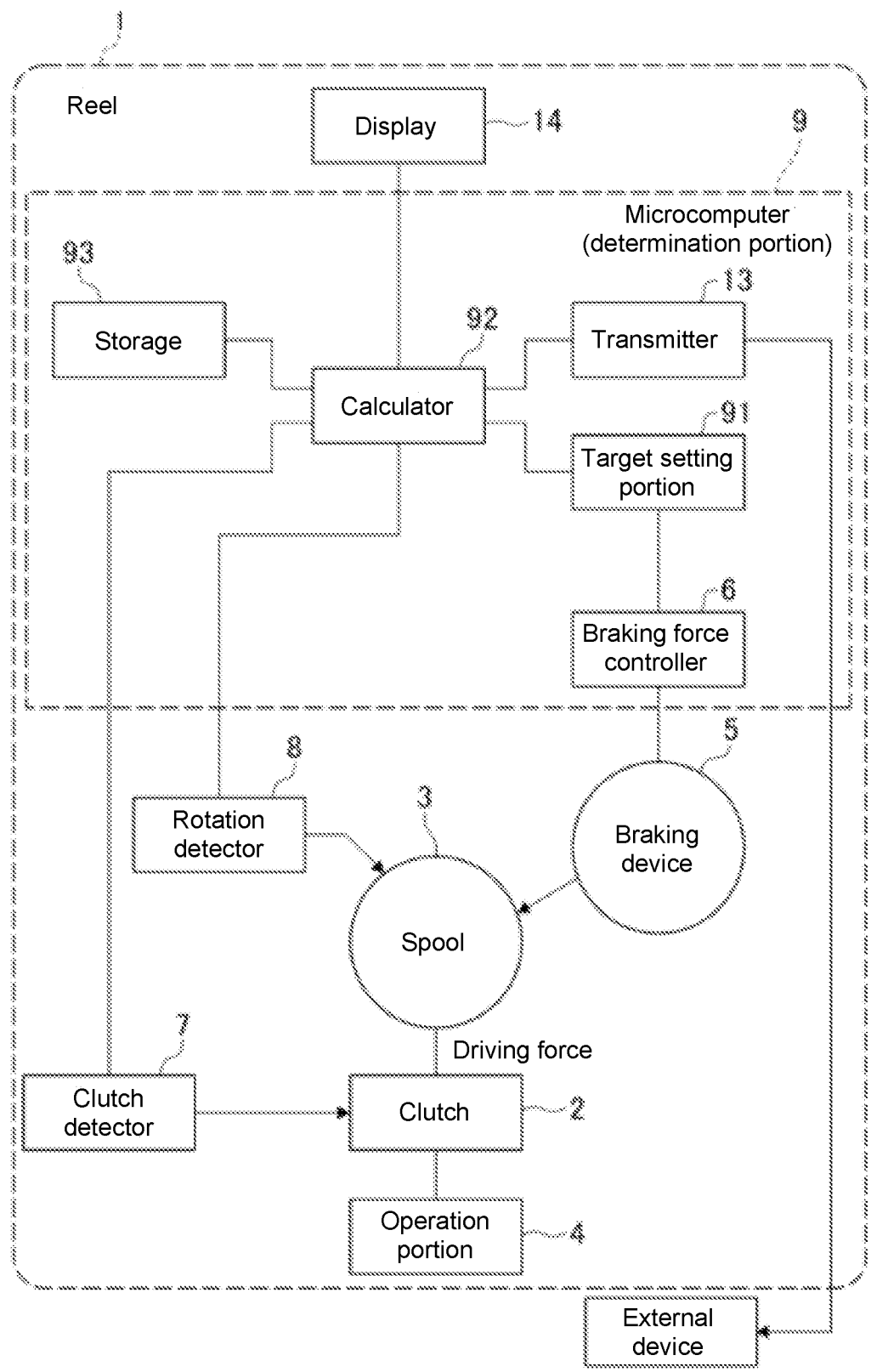
FIG. 1 is a diagram illustrating a fishing reel according to an embodiment of the present disclosure.

Hereinafter, embodiments of the present disclosure will be described in detail with reference to the accompanying drawings. Components common in the plurality of drawings are denoted by the same reference numerals through the plurality of drawings. It should be noted that each of the drawings is not necessarily scaled for convenience of explanation.

First, the basic configuration of the fishing reel 1 will be described with reference to FIG. 1. As illustrated, the fishing reel 1 includes a spool 3 that winds a fishing line, an operation portion 4 that rotates the spool 3, a clutch 2 that switches from being transmissible to non-transmissible and vice versa between the operation portion 4 and the spool 3, a brake (braking unit or braking portion) (spool brake) 5 that generates a braking force on the spool 3, and a braking force controller (braking force controlling unit or braking force controlling portion) (spool braking force controller) 6 that adjusts the braking force.

Further, as illustrated, the fishing reel 1 includes a clutch detector (clutch detecting unit or clutch detecting portion) 7 that detects whether or not the clutch can transmit power, and a rotation detector 8 that detects the rotation of the spool 3. The clutch detector 7 is configured by a magnetic sensor or the like, and detects whether or not the clutch 2 can transmit power, by providing a portion to be detected such as a magnet in the movable portion of the clutch 2.

Further, the rotation detector 8 can be configured by a combination of a detection means such as a photo interrupter and a means to be detected such as a light shielding plate provided on the spool 3. This allows the rotation of the spool 3 to be converted into an electrical signal. The combination of the detection means and the means to be detected is not limited to the above example, and a known means such as a magnet and a magnetic sensor can be used. In addition, a handle operation detector (handle operation detecting unit or handle operation detecting portion) that detects the operation information of the operation portion 4, or a deflection detector (deflection detecting unit or deflection detecting portion) that detects the deflection of a fishing rod 10 may be provided in the fishing rod 10.

The fishing reel 1 has a microcomputer 9 (the determination portion (determination unit) described below) that processes various signals. The microcomputer 9 is powered from a power supply such as a battery (not illustrated), and performs various calculations as below. It also receives signals of the rotation detector 8, and calculates the rotation speed of the spool 3 and the pull-out amount of a fishing line. The history of said changes over time may also be stored in the recorder (recording unit or recording portion). Further, the backlash determination, which will be described later, is performed based on the rotation information of the spool 3.

Some calculations may, after transmission to an external device such as a mobile terminal and PC, be performed by a microcomputer of said device. In this case, the rotation information of the spool 3 is transferred to the external device by, for example, wireless connection, and is calculated in said external device as necessary. These calculation results are output to a display (display means) 14. The display 14 may be a LCD provided on the reel 1 or the fishing rod 10 or may be a display within an external device such as a portable terminal and PC.

Next, each element constituting the fishing reel 1 will be described. The spool 3, which is rotatably supported with respect to the fishing reel 1, can wind a fishing line by forward rotation, and unwind the wound fishing line by backward rotation. The operation portion 4 is configured as, for example, a handle, and can rotate the spool 3 forward, transmitting the rotation operation by a user to the spool 3 through a transmission mechanism such as a gear. Incidentally, the operation portion 4 may be a combination of an operation member such as a lever, and a power source such as a motor.

The clutch 2 can switch between an ON state in which power is transmissible to the spool 3 and an OFF state with no power transmission. The spool 3 can be rotated forward by an operation member 3 in the ON state, and can be rotated forward and backward in the OFF state regardless of the state of the operation member 3 (spool-free state). Further, a drag mechanism may be provided so that a breakage of a fishing line may be prevented by rotating the spool 3 backward when an excessive load is applied to the spool 3.

Figures 2A, 2B, 2C, 2D:
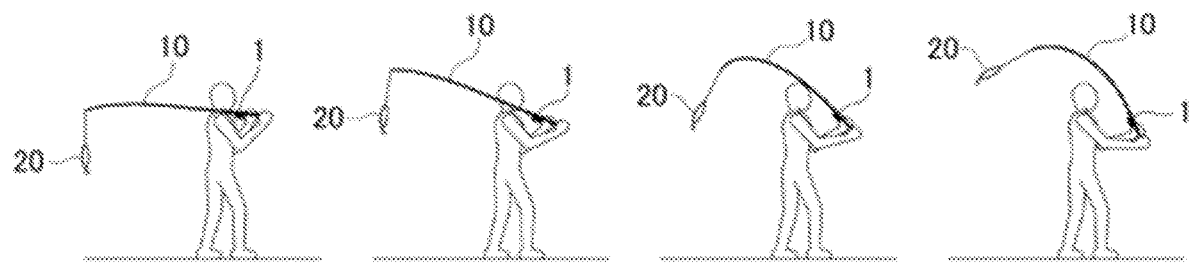
FIG. 2A is a diagram illustrating a procedure for casting and retrieving fishing tools such as a lure using a fishing reel according to an embodiment of the present disclosure.
FIG. 2B is a diagram illustrating a procedure for casting and retrieving fishing tools such as a lure using a fishing reel according to an embodiment of the present disclosure.
FIG. 2C is a diagram illustrating a procedure for casting and retrieving fishing tools such as a lure using a fishing reel according to an embodiment of the present disclosure.
FIG. 2D is a diagram illustrating a procedure for casting and retrieving fishing tools such as a lure using a fishing reel according to an embodiment of the present disclosure.
Figures 2E, 2F, 2G:
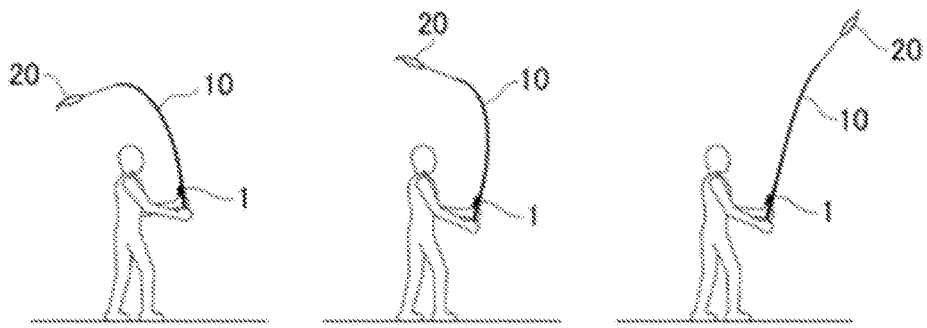
FIG. 2E is a diagram illustrating a procedure for casting and retrieving fishing tools such as a lure using a fishing reel according to an embodiment of the present disclosure.
FIG. 2F is a diagram illustrating a procedure for casting and retrieving fishing tools such as a lure using a fishing reel according to an embodiment of the present disclosure.
FIG. 2G is a diagram illustrating a procedure for casting and retrieving fishing tools such as a lure using a fishing reel according to an embodiment of the present disclosure.
Figure 3A:
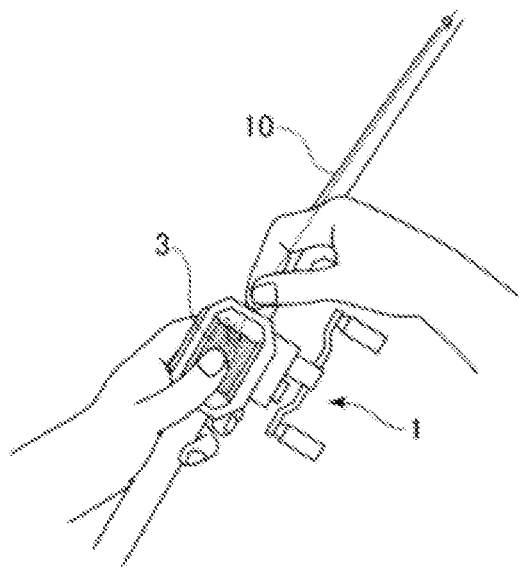
FIG. 3A is a diagram illustrating an example of disentangling a fishing line in a fishing reel according to an embodiment of the present disclosure.
Figure 3B:
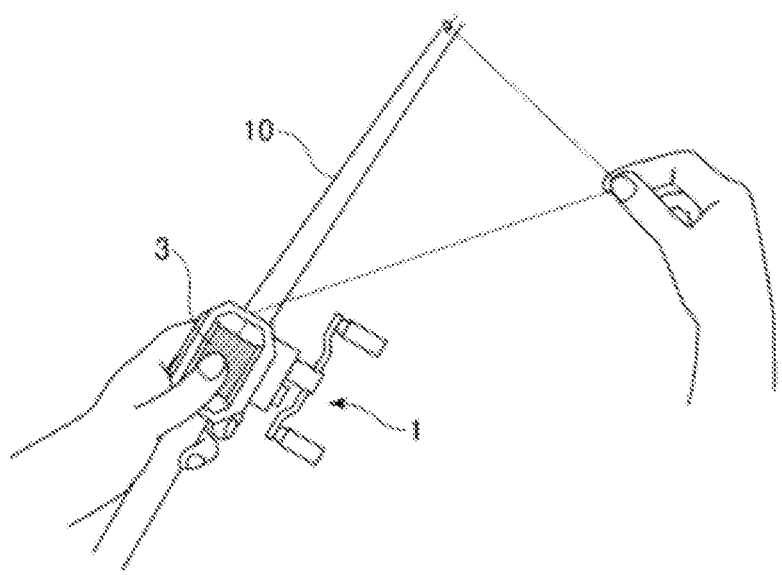
FIG. 3B is a diagram illustrating an example of disentangling a fishing line in a fishing reel according to an embodiment of the present disclosure.

Next, an example of a procedure for casting and retrieving fishing tools such as a lure using a general reel including the reel will be described with reference to FIGS. 2 and 3. First, as shown in FIG. 2(*a*), a lure 20 is adjusted by the operation member 3 to a predetermined length from the rod tip to turn off the clutch 2 (not illustrated), making it a spool-free state. At this time, the spool 3 of the reel 1 is pressed by a thumb so that the fishing line is not unwound due to the self-weight of the lure 20 or the like.

Next, as shown in FIGS. 2(*b*) to 2(*d*), the initial speed is given to the lure 20 by swinging the fishing rod 1. Then, as shown in FIG. 2(*f*), the lure 20 can be cast when releasing the thumb from the spool 3 at the timing when the speed and the unwinding direction of the lure become appropriate.

Further, after the moment in FIG. 2(*g*) following casting, the lure 20 starts decelerating, receiving tension from the fishing line and air resistance. On the other hand, the spool 3 starts rotating backward due to tension from the fishing line. When the unwinding speed of the fishing line coincides with the flying speed of the lure 20, the spool 3 rotates at a maximum speed, and the fishing line loses tension. The luer 20 continues to decelerate thereafter due to air resistance and the like. Then, if the spool 3 continues to rotate at high speed due to inertia, the unwinding speed of the fishing line exceeds the flying speed of the lure 20. As a result, the fishing line is excessively reeled out, and is entangled in the reel 1, which is called backlash. To avoid this, a predetermined braking force can be applied to the spool 3 by a braking device 5.

Thereafter, when the lure 20 is sufficiently lowered, it will land on water. At this time, if the braking force from the braking device 5 is too large, the casting distance of the lure 20 is shortened. On the other hand, if the braking force from the braking device 5 is too small, the fishing line is entangled, and cannot be wound nor unwound normally.

If the thumb is released from the spool 3 too late, the lure 20 flies downward and then immediately decelerates after colliding with the water surface at high speed. In the event of said immediate deceleration, the spool 3 continues to rotate at high speed, and the fishing line is excessively unwound, which causes a serious line entanglement in the reel 1. Users with less experience in casting operations tend to face such line entanglement frequently.

When the flying speed of the lure becomes zero, the casting operation ends. Then, in the absence of a line entanglement, the user waits for a fish bite by means appropriate for a fish species and fishing method, such as letting the lure swim or remain as it is, by operating the rod and the operation member 3.

A severe line entanglement, if any, causes the entangled line to prevent the normal rotation of the spool, which makes it impossible to perform a winding operation. Even if the line is not so badly entangled, it is desirable to pull in the slack of the line in order to prevent further trouble from occurring. Therefore, a user needs to disentangle the line prior to winding up the line. The user needs to follow the following steps to disentangle the line.

1: Enabling the line to be unwound by, for example, switching off the clutch or relaxing the set drag force of the drag device 2: Pulling out the slacked portion of the line 3: Disentangling the portion of the line that cannot be pulled out 4: Pulling out the line until the slack disappears after disentangling the line 5: Winding the line on the spool after eliminating the slack 6: Starting fishing again after the line pulled out is completely wound up and there is no slack of the line In the event of performing the above operations, the user repeats the operation of pinching the slack line and pulling out the same by stretching his/her arm as shown in FIG. 3. The line wound on the spool is pulled out intermittently a plurality of times by approximately several tens of centimeters to 1 m. This operation is required many times when the line is badly entangled, but it is done soon otherwise.

The fishing reel 1 according to an embodiment of the present disclosure will be described. The fishing reel 1 according to an embodiment of the present disclosure is configured to include the spool 3 capable of winding a fishing line, the operation portion 4 that rotates the spool 3, the rotation detector 8 that detects the rotation of the spool 3, and a determination portion 9 that determines the backlash correction status from the output of the rotation detector 8.

The fishing reel 1 according to an embodiment of the present disclosure makes it possible to provide a fishing reel capable of discriminating the occurrence of a backlash.

In the fishing reel 1 according to an embodiment of the present disclosure, the determination portion 9 is configured to determine that there is a shift to the backlash correction status when the spool rotation speed becomes equal to or greater than a predetermined pull-out speed a plurality of times.

In the fishing reel 1 according to an embodiment of the present disclosure, the determination portion 9 is configured to determine that the backlash correction status ends when the rotation speed of the spool 3 becomes equal to or greater than a predetermined winding speed.

Next, the fishing reel 1 according to an embodiment of the present disclosure includes the display 14, wherein the display 14 is configured to display at least one of the backlash correction status, the time spent in the backlash correction status, or the ratio of the cumulative time spent in the backlash correction status to a usage time of the fishing reel 1. This enables users to more accurately and precisely grasp the backlash correction status.

The fishing reel 1 according to an embodiment of the present disclosure includes a transmitter 13, wherein the transmitter 13 is configured to transmit to the outside at least one of the backlash correction status, the time spent in the backlash correction status, or the ratio of the cumulative time spent in the backlash correction status to the usage time of the fishing reel. Said transmission to an external device (e.g., information communication terminal and wearable terminal) enables users to more accurately and precisely grasp the backlash correction status.

In the fishing reel 1 according to an embodiment of the present disclosure, the display 14 is configured to display an advisory, encouragement, or admiring message related to the backlash correction according to the time spent in the backlash correction status. The details will be described later.

The fishing reel 1 according to an embodiment of the present disclosure includes a spool brake, wherein the spool brake 5 is configured to change the spool braking force according to the time spent in the backlash correction status. The details will be described later.

In the fishing reel 1 according to an embodiment of the present disclosure, the backlash correction time is configured to be at least one of a time spent on each backlash correction or a cumulative time spent on a plurality of backlash corrections.

The fishing reel 1 according to an embodiment of the present disclosure includes a storage 93, wherein the storage 93 is configured to associate and store the setting of the braking force of a spool and the backlash correction status.

The fishing reel 1 according to an embodiment of the present disclosure includes a skill level evaluator (not illustrated), wherein the skill level evaluator evaluates the skill level according to the ratio of the time spent in the backlash correction status to the usage time of the fishing reel, and wherein the display 14 is configured to display the skill level.

The backlash correction status determination device 100 according to an embodiment of the present disclosure is configured to include the rotation detector 8 that detects the rotation of a spool capable of winding a fishing line, and the determination portion 9 that determines the backlash correction status from the output of the rotation detector 8. Here, the backlash correction status determination device 100 may be provided on the fishing reel 1 or the fishing rod 10. Alternatively, part of the backlash correction status determination device 100 may be provided on the fishing reel 1 or the fishing rod 10, and the rest of said device may be provided on an external device.

The backlash correction status determination device 100 according to an embodiment of the present disclosure makes it is possible to provide a backlash correction status determination device capable of determining the occurrence of a backlash.

Next, a method for detecting a line entanglement will be described in more detail with reference to FIG. 4. Among the uses of a reel, the way a fishing line is unwound is seen only during backlash corrections. Therefore, it is possible to estimate the occurrence of a backlash and the severity of the line entanglement by detecting said operation and measuring the duration.

Figure 4A:
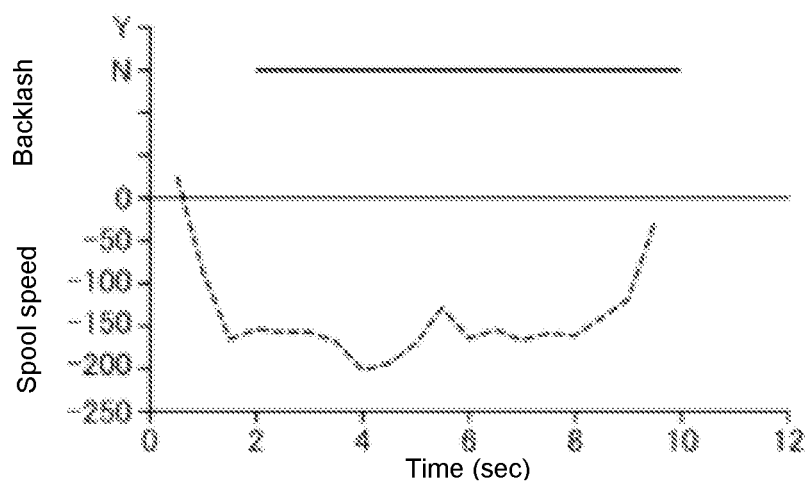
FIG. 4A is a diagram illustrating a method for detecting entanglement of a fishing line in a fishing reel 1 or a backlash correction status determination device 100 according to an embodiment of the present disclosure.
Figure 4B:
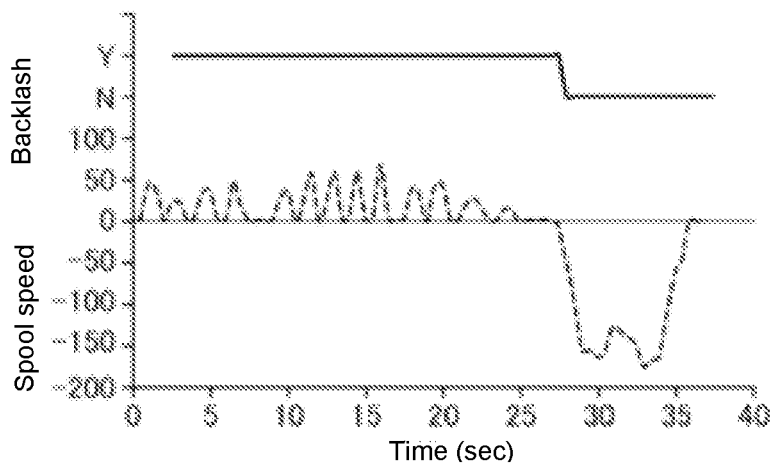
FIG. 4B is a diagram illustrating a method for detecting entanglement of a fishing line in a fishing reel 1 or a backlash correction status determination device 100 according to an embodiment of the present disclosure.
Figure 4C:
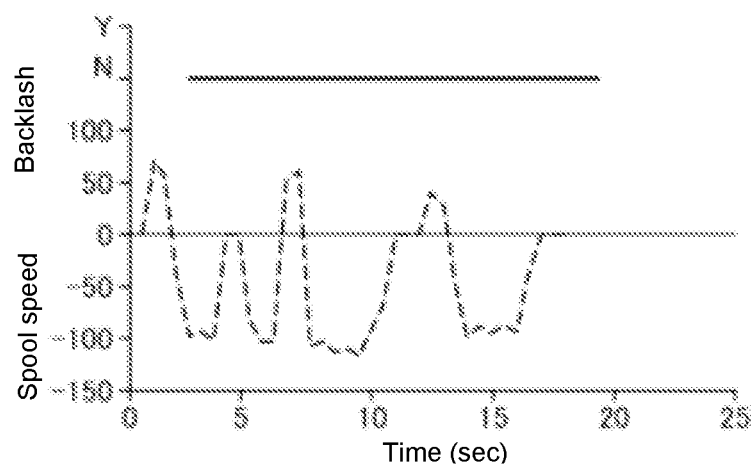
FIG. 4C is a diagram illustrating a method for detecting entanglement of a fishing line in a fishing reel 1 or a backlash correction status determination device 100 according to an embodiment of the present disclosure.

FIG. 4 is a graph illustrating the change in the spool rotation speed over time during a winding operation. The vertical axis represents a spool rotation speed where a positive value means the unwinding direction and a negative value means the winding direction. FIG. 4(*a*) shows a state in which the winding is normally done without the occurrence of a backlash after casting, FIG. 4(*b*) shows a state in which a backlash, which has occurred after casting, is corrected, and FIG. 4(*c*) shows a state in which a fish is caught immediately after casting, and the line is unwound by a drag device from a spool. The upper plot in the figure shows backlash occurrence determination results obtained by the determination method described later.

In FIG. 4(*a*), the user successfully cast without the occurrence of a backlash and therefore, can start the winding operation immediately after the casting. In this case, the spool 3 rotates only in the winding direction, not in the unwinding direction. Next, in FIG. 4(*b*), since a line is entangled, the user disentangles the line as referred to above after casting and therefore, the line is pulled out intermittently. The spool 3 is rotated by the user in the unwinding direction.

Further, FIG. 4(*c*) shows a case where the spool 3 rotated backward because a fish bit a lure almost as soon as the lure landed on water and pulled the fishing line with a tension greater than the set drag force. Again, as in FIG. 4(*b*), the spool 3 may rotate in the unwinding direction.

However, there are some differences as follows. In FIG. 4(*b*), the line is pulled out intermittently a plurality of times. The interval, the amount pulled out each time, and the speed are generally fixed (in accordance with the interval, length and speed at which the line can be easily pulled with an arm). On the other hand, the number of pull-out operations, the pull-out amount, and the speed in FIG. 4(*c*) vary depending on the reaction of a fish and are random.

In FIG. 4(*b*), after acceleration is made to a predetermined speed (speed at which a line is easily pulled out with an arm=approx. 1 m/s), the speed becomes zero. It is generally not rotated in the winding direction; however, it needs be rotated carefully and slowly if necessary. On the other hand, in FIG. 4(*c*), it may rotate in the winding direction as the user tries to reel the fish operating the handle. The rotation speed at this time is greater than that in FIG. 4(*b*). (B) and (C) can be distinguished based on these differences.

Figure 5:
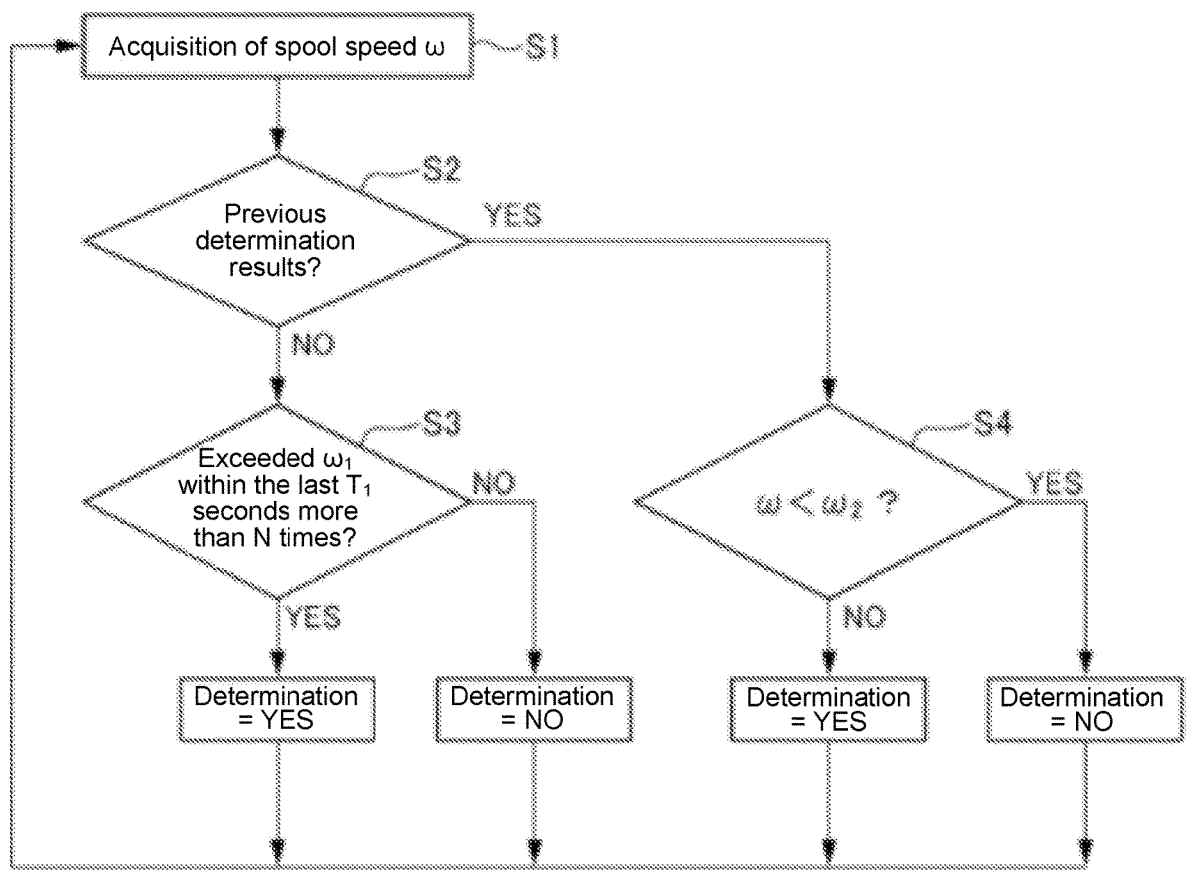
FIG. 5 is a diagram illustrating a flow of a method for determining the occurrence of a backlash in the fishing reel 1 or the backlash correction status determination device 100 according to an embodiment of the present disclosure.

This specific calculation method will be described with reference to the flowchart in FIG. 5. When the end of casting is detected, the program is started. Said detection is made, for example, when a clutch is switched from OFF to ON, or when a spool rotating at high speed stops or decelerates to a predetermined speed.

After the program is started, the rotation speed of the spool is constantly monitored in (S1). Next, in (S2), the subsequent processing is changed according to the immediately preceding backlash determination results. Since the initial setting is to determine that there is no backlash, the first process moves on from (S2) to (S3).

In (S3), the number of times that the spool rotation speed $\omega$ exceeds the rotation speed $\omega 1$ (predetermined rotation speed), which is a rising threshold, within the past T1 seconds is counted. That is, when $\omega 1$ is 20, it is counted in the number of times when $\omega$ changes from 0 to 30, and it is not when $\omega$ continues to be 20 or more.

When the count value is N times or more, it is determined that a backlash correction is in progress. By appropriately setting the values of N and T1, the cases in (B) and (C) can be distinguished from each other. The larger N is, the less likely the tug of a fish is erroneously determined to be a backlash; however, the time T1 required to determine the occurrence of a backlash increases. In the present embodiment, for example, N and T1 are set to 2 and 3 seconds, respectively. Further, $\omega 1$ may be set to a value equal to or less than the rotation speed equivalent to the speed at which a user pulls a fishing line when disentangling the line, and in the present embodiment, for example, it is set to a speed equivalent to 10 cm per second. This value varies depending on the diameter of the fishing line wound on a spool.

When the determination is completed, the process returns to (S1) again. If the process moves on to (S2) after it is determined that a backlash has occurred, the process moves on to (S4). When a fishing line is wound in the winding direction at a spool speed greater than the predetermined value $\omega 2$ (−50 in the present embodiment), it is determined that the user has resolved the backlash. Once it is determined a backlash has occurred, it is considered that the backlash remains unresolved until there occurs a winding larger than this $\omega 2$ in absolute value, and the determination result remains NO.

Next, when it is determined in (S4) that the backlash has been resolved, the process moves on to (S3) again the next time and thereafter, and the next backlash collection is detected.

Incidentally, in addition to the above configuration, the more accurate determination can be made when detecting the difference between the above-described (B) and (C) with a deflection sensor attached to the fishing rod 10. When disentangling a fishing line as shown in (B), the fishing rod is hardly deflected. On the other hand, when there is a fish bite as shown in (C), it is common to counter the tug of the fish, raising the rod in the vertical direction to bend the rod. Therefore, when the value of the deflection sensor is equal to or greater than a predetermined value, it is determined that the fishing line is pulled out due to the tug of a fish in (C). Further, the speed and rotation amount of the handle operation tend to be higher or larger in the case of (C) than in the case of (B). When the handle operation detected shows a value equal to or greater than a predetermined value, it may be determined that it is (C).

The method for determining the occurrence of a backlash in the fishing reel 1 or the backlash correction status determination device 100 according to an embodiment of the present disclosure is not limited to the above method, and may be another calculation method as long as a line disentanglement by a user can be determined from a spool rotation speed. For example, a line disentanglement correction can also be determined by having the feature differences of a lot of sample data of (A), (B) and (C) prepared in advance recognized by machine learning or neural network calculation methods.

The following is also a possible another method. If the total pull-out amount for several seconds immediately after casting is equal to or greater than a predetermined value, it can be determined to be (B) or (C), and if the deflection amount of the fishing rod is equal to or less than a predetermined value, it can be determined to be (B). As an alternative to the deflection amount of the fishing rod, a distinction between (B) and (C) can also be made by detecting whether a user has operated a rod as selected thereby (raising the rod to counter the tug of a fish) when there is a fish bite with the use of a motion sensor provided on the reel or fishing rod.

Next, the method for using determination results obtained from the fishing reel 1 or the backlash correction status determination device 100 according to an embodiment of the present disclosure will be described. The determination results can be provided to a user by displaying the same on a display, and can also be used in another device or the like. The calculation of a backlash rate is one possible example. Here, the backlash rate can be calculated by dividing the total time spent in a backlash status by the total usage time of the reel or the total time required for the winding operation. Alternatively, the number of times of casting with the occurrence of a backlash may be divided by the total number of times of casting.

Figure 6:
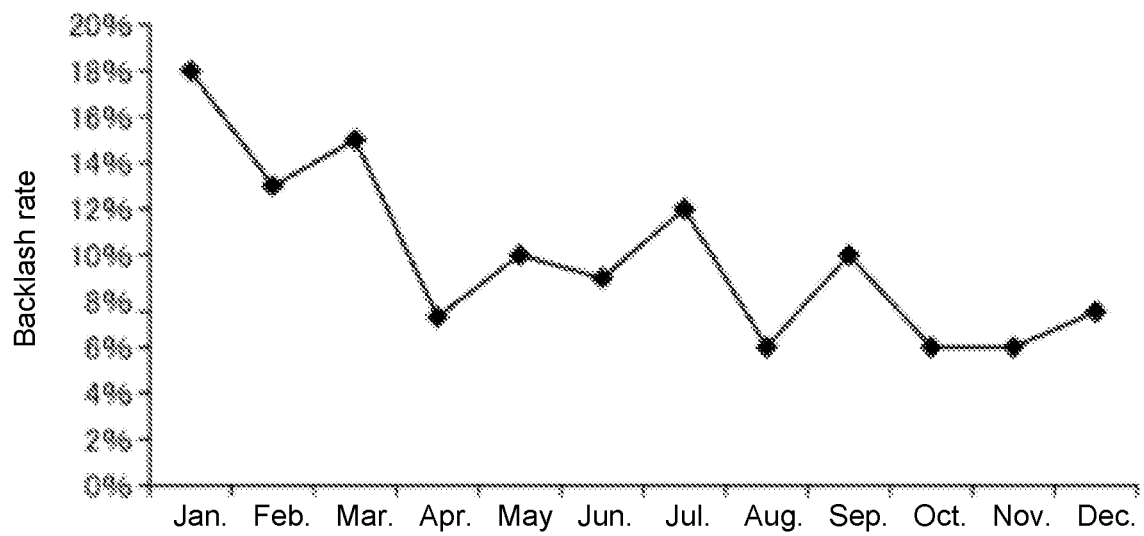
FIG. 6 is a diagram illustrating an example of a display screen of the fishing reel 1 or the backlash correction status determination device 100 according to an embodiment of the present disclosure.
Figure 7:
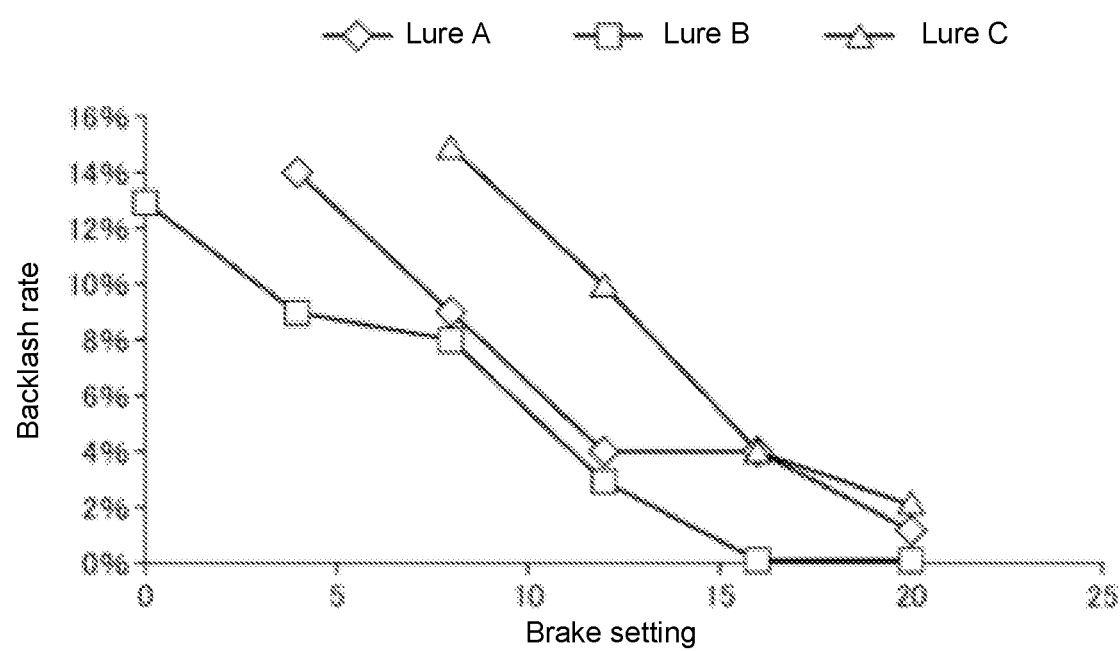
FIG. 7 is a diagram illustrating an example of a display screen of the fishing reel 1 or the backlash correction status determination device 100 according to an embodiment of the present disclosure.

Further, the backlash rate can also be used as an indicator of a user's skill level. For example, displaying the change in the backlash rate over time as shown in FIG. 6 gives a user a realization of his/her skill improvement. In addition, as shown in FIG. 7, the user can select an optimum brake setting with reference to the backlash rates displayed for each lure or braking device setting.

Further, a casting method to reduce backlash and advice about disentanglement can also be displayed for users who have caused backlashes. Moreover, an encouragement message for a user who has caused a backlash and an admiring message for a user who has never caused a backlash may also be displayed. For example, as shown in FIG. 8, the possible means to display said messages include displaying a link to a video to provide an encouragement message, advice and the like when a backlash correction time becomes equal to or greater than a predetermined value.

Further, when a backlash occurs, the braking force of a braking device can be set to increase at the next casting. Upon the occurrence of a backlash, a user cannot continue fishing. However, the larger the braking force of the braking device is, the less likely a backlash occurs; therefore, the risk of the user discontinuing fishing can be automatically reduced by automatically increasing the braking force when detecting the occurrence of a backlash.

The dimensions, materials and arrangements of each component described herein are not limited to those explicitly described in the embodiments, and each component can be modified to have any dimension, material and arrangement that can be included within the scope of the present disclosure. Further, components that are not explicitly described herein may be added to the described embodiments, or some of the components described in each embodiment may also be omitted.

DESCRIPTION OF THE NUMERICAL REFERENCES

1 Fishing reel
2 Clutch
3 Spool
4 Operation portion
5 Spool brake
6 Spool braking force controller
8 Rotation detector
9 Microcomputer (determination portion)
10 Fishing rod
11 Braking force setting portion
13 Transmitter/receiver (transmitter)
14 Display
20 Lure
91 Target setting portion
92 Calculator
93 Storage
100 Backlash correction status determination device

What is claimed is:

1. A fishing reel comprising:
a spool capable of winding a fishing line;
an operation portion that rotates the spool;
a rotation detector that detects the rotation of the spool; and
a determination portion that determines a backlash correction status from an output of the rotation detector,
wherein the determination portion determines that there is a shift to the backlash correction status when a spool rotation speed becomes equal to or greater than a predetermined pull-out speed a plurality of times.

2. The fishing reel according to claim 1, wherein the determination portion determines that the backlash correction status ends when the spool rotation speed becomes equal to or greater than a predetermined winding speed.

3. The fishing reel according to claim 1, comprising a display, wherein the display displays at least one of the backlash correction status, a time spent in the backlash correction status, or a ratio of a cumulative time spent in the backlash correction status to a usage time of the fishing reel.

4. The fishing reel according to claim 3, wherein the display displays an advisory, encouragement, or admiring message related to the backlash correction status according to the time spent in the backlash correction status.

5. The fishing reel according to claim 3, wherein the time spent in the backlash correction status is at least one of a time spent on each backlash correction or a cumulative time spent on a plurality of backlash corrections.

6. The fishing reel according to claim 3, comprising a skill level evaluator, wherein the skill level evaluator evaluates a skill level according to a ratio of the time spent in the backlash correction status to a usage time of the fishing reel, and wherein the display displays the skill level.

7. The fishing reel according to claim 1, comprising a spool brake, wherein the spool brake changes a spool braking force according to a time spent in the backlash correction status.

8. The fishing reel according to claim 1, comprising a storage, wherein the storage associates and stores a setting of a braking force of the spool and the backlash correction status.

9. A fishing reel comprising:
a spool capable of winding a fishing line;
an operation portion that rotates the spool;
a rotation detector that detects the rotation of the spool;
a determination portion that determines a backlash correction status from an output of the rotation detector; and
a transmitter, wherein the transmitter transmits to an outside at least one of the backlash correction status, a time spent in the backlash correction status, or a ratio of a cumulative time spent in the backlash correction status to a usage time of the fishing reel.

10. A backlash correction status determination device comprising:
a rotation detector that detects a rotation of a spool capable of winding a fishing line; and
a determination portion that determines a backlash correction status from an output of the rotation detector,
wherein the determination portion determines that there is a shift to the backlash correction status when a spool rotation speed becomes equal to or greater than a predetermined pull-out speed a plurality of times.

* * * * *